Figure 2:
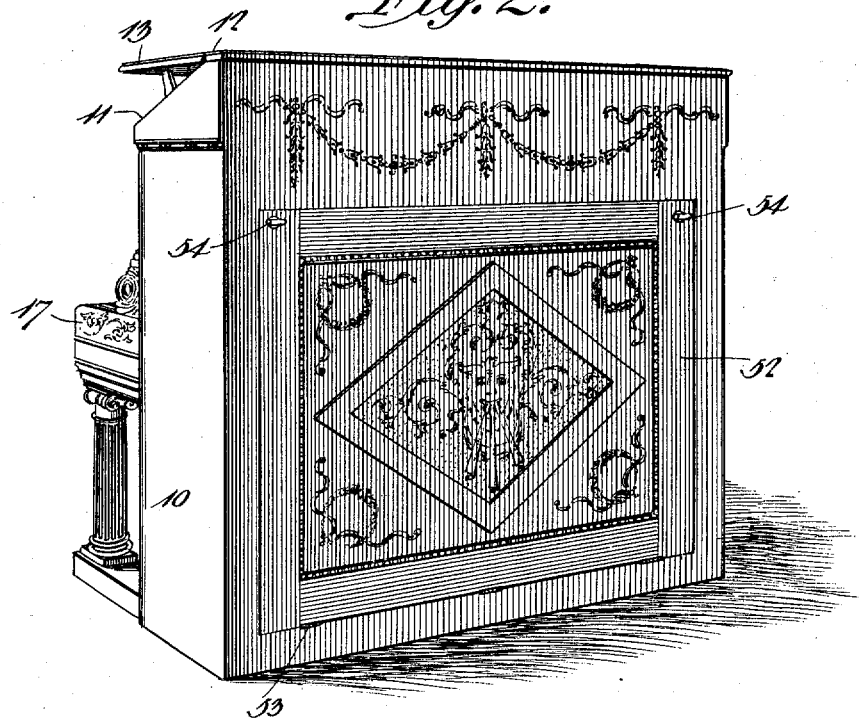

No. 717,600. PATENTED JAN. 6, 1903.
L. W. NORCROSS.
PIANO.
APPLICATION FILED SEPT. 6, 1901.
NO MODEL. 6 SHEETS—SHEET 1.
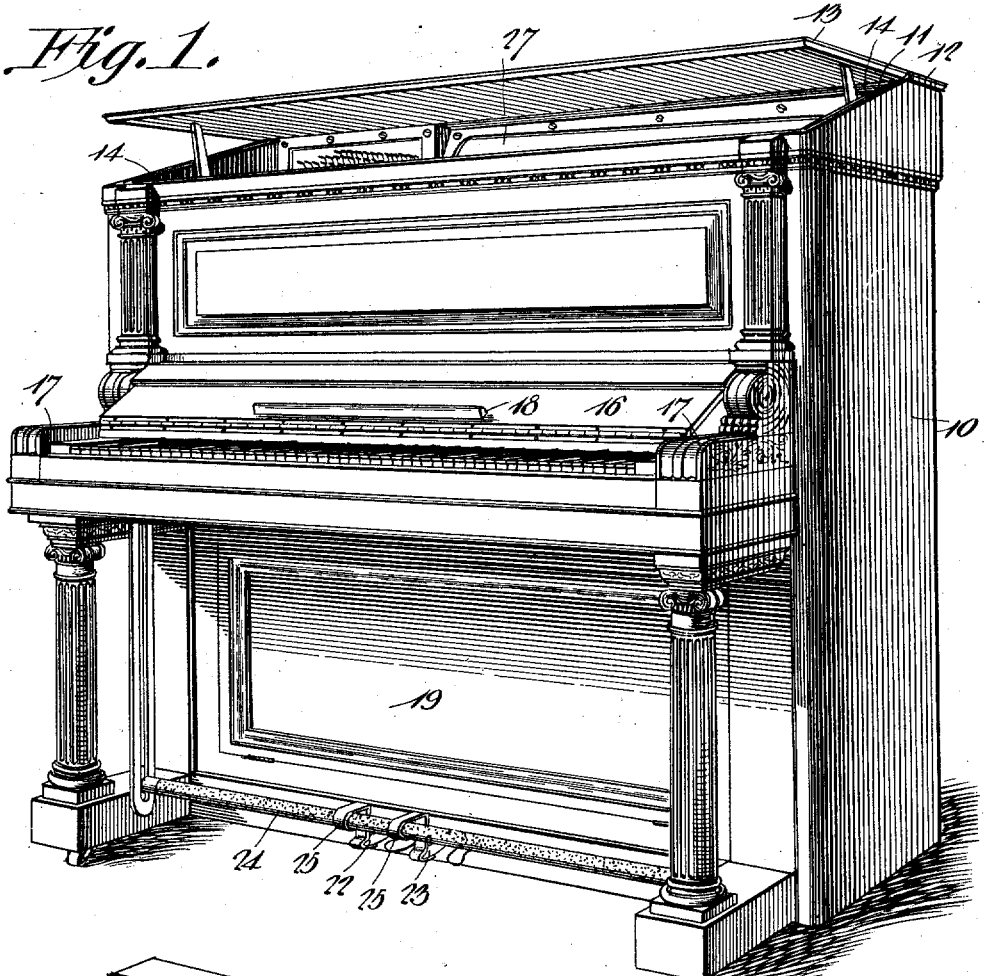
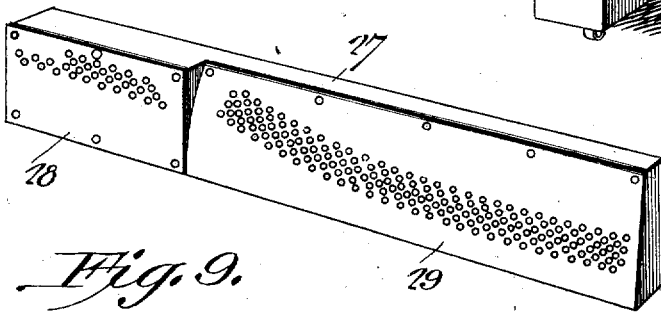

No. 717,600. PATENTED JAN. 6, 1903.
L. W. NORCROSS.
PIANO.
APPLICATION FILED SEPT. 6, 1901.
NO MODEL. 6 SHEETS—SHEET 2.

No. 717,600. PATENTED JAN. 6, 1903.
L. W. NORCROSS.
PIANO.
APPLICATION FILED SEPT. 6, 1901.
NO MODEL. 6 SHEETS—SHEET 3.

Witnesses

L. W. Norcross, Inventor.
by C. A. Snow & Co.
Attorneys

No. 717,600. PATENTED JAN. 6, 1903.
L. W. NORCROSS.
PIANO.
APPLICATION FILED SEPT. 6, 1901.
NO MODEL. 6 SHEETS—SHEET 4.

No. 717,600. PATENTED JAN. 6, 1903.
L. W. NORCROSS.
PIANO.
APPLICATION FILED SEPT. 6, 1901.
NO MODEL. 6 SHEETS—SHEET 5.

Witnesses L. W. Norcross, Inventor.

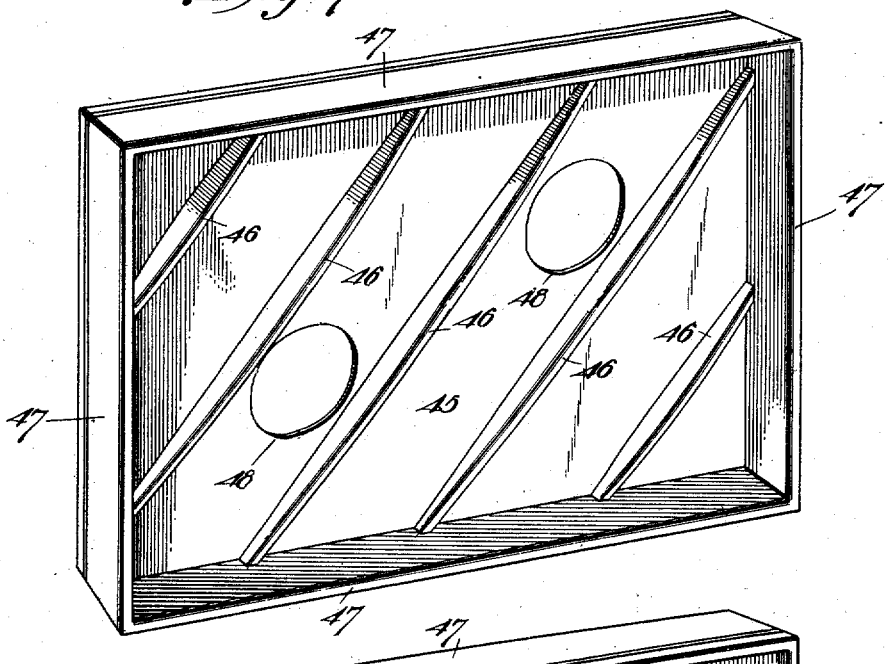

UNITED STATES PATENT OFFICE.

LEVI WATSON NORCROSS, OF PARIS, TEXAS.

PIANO.

SPECIFICATION forming part of Letters Patent No. 717,600, dated January 6, 1903.

Application filed September 6, 1901. Serial No. 74,527. (No model.)

*To all whom it may concern:*

Be it known that I, LEVI WATSON NORCROSS, a citizen of the United States, residing at Paris, in the county of Lamar and State of Texas, have invented a new and useful Piano, of which the following is a specification.

My invention relates to certain improvements in pianos, and while particularly designed for use in connection with upright pianos many of the features are applicable to pianos of the square type.

An object of the invention is to provide a construction of string-supporting frame which will obviate the necessity of dividing the treble portion of the scale and the customary cutting away of the treble sounding-board bridge for the passage of the short brace usually formed on the frame between the treble wrest-bridge and the treble hitch-pin plate, the bridge being thus left continuous from end to end and preserving an even tone throughout the treble scale.

A further object of the invention is to materially strengthen the construction of the string-frame and to provide the same with rearwardly-extending flanges to form a receptacle and support for the sounding-board.

A still further object of the invention is to arrange in the rear of the sounding-board a sound-chamber or tone-reflector, of which the sounding-board forms the front, the rear being arranged in the form of a solid panel which may be wholly closed to confine the sound-waves or may at times be opened to a greater or less degree to permit of their free escape.

A still further object of the invention is to provide in the sounding-board one or more openings for the escape of sound-waves developed within the chamber at the rear of the board, the solid back panel increasing the reverberations and materially increasing the volume of sound.

A still further object of the invention is to provide a piano-casing as nearly air-tight as possible in order to lessen or soften the volume of sound when necessary and to prevent the entrance of dust and vermin to the interior of the casing; and a still further object is to provide the piano with a casing finished at the back in a manner equally as attractive as at the front, so that the instrument may be placed in the center or other portion of a room where its back will be exposed to view.

Other objects and advantages of the invention will be apparent from the following description.

Figure 5:
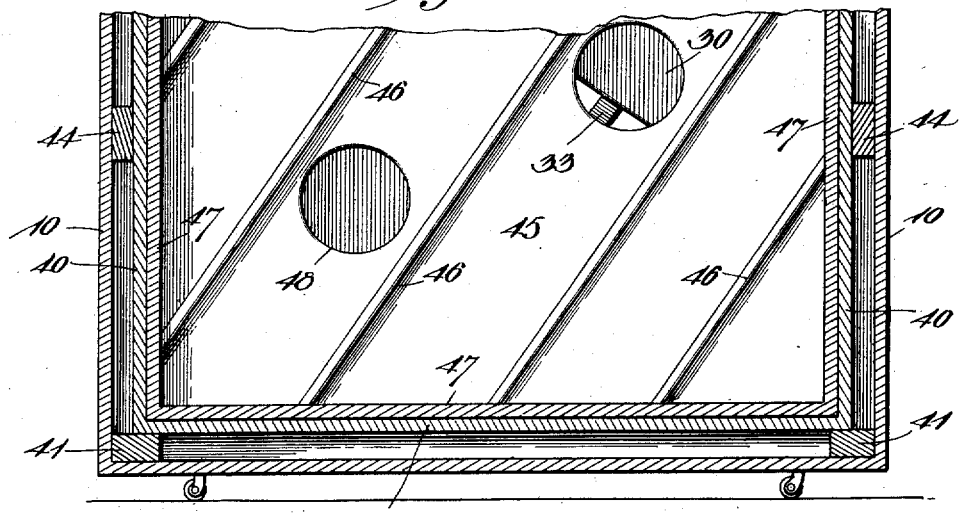
Figure 3:
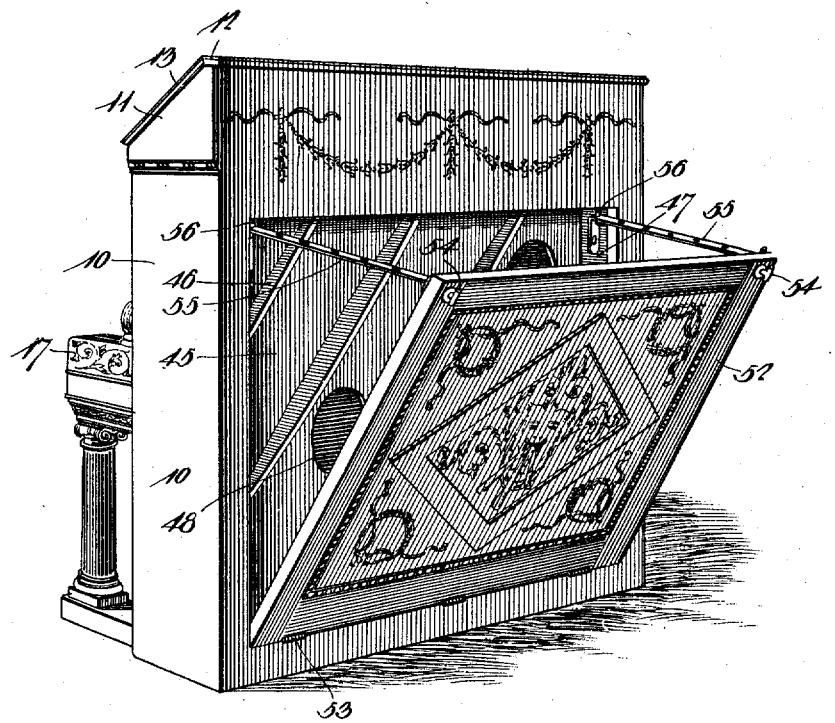
Figure 10:
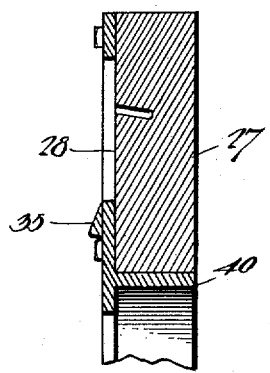
Figure 11:
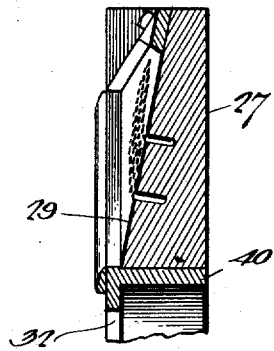
Figure 4:
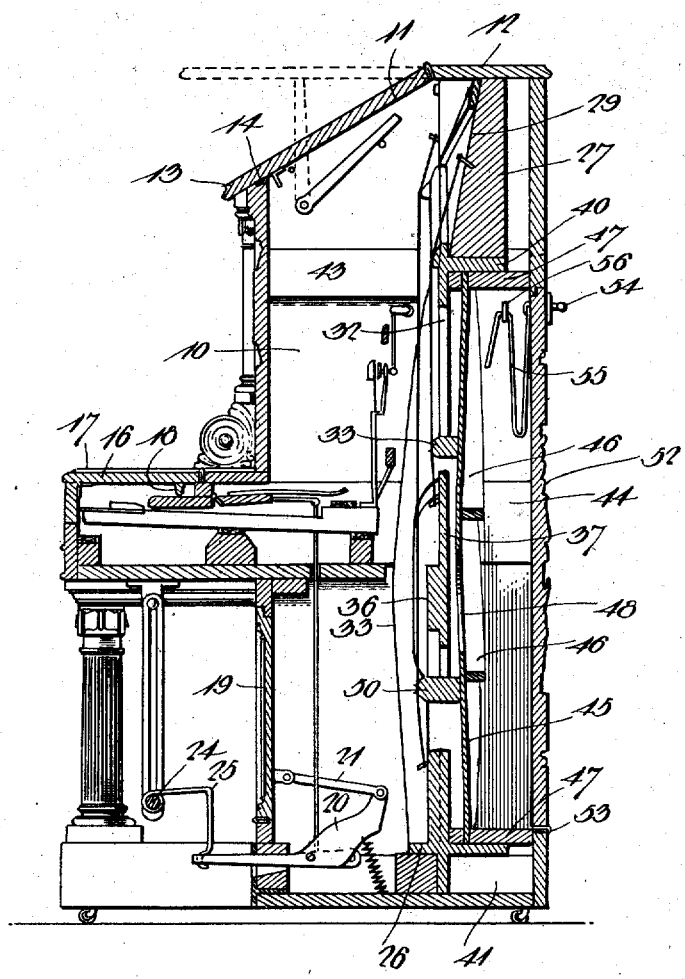
Figure 6:
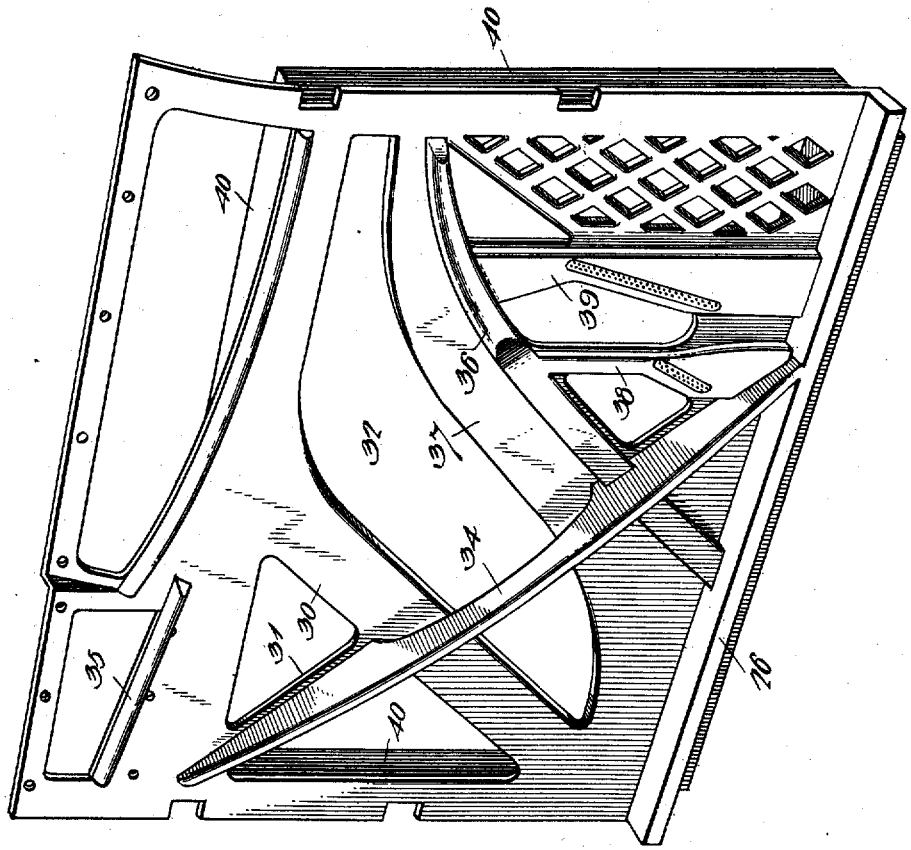

In the accompanying drawings, Figure 1 is a perspective view of the front portion of a piano constructed in accordance with my invention. Fig. 2 is a similar view of the rear portion of the same. Fig. 3 is a perspective view looking from the rear and illustrating the back panel in an open position. Fig. 4 is a transverse sectional elevation of the instrument. Fig. 5 is a longitudinal sectional elevation of the piano through the sounding-chamber. Fig. 6 is a detached perspective view of the string-supporting frame. Fig. 7 is a detached perspective view of the sounding-board looking from the rear of the instrument. Fig. 8 is a view similar to Fig. 7 looking from the front. Fig. 9 is a detached perspective view of the wrest-plank. Figs. 10 and 11 are transverse sectional elevations through the bass and treble portion of the wrest-plank, illustrating the respective positions of such portions of the wrest-plank in the string-frame.

Similar numerals of reference indicate corresponding parts throughout the various figures of the drawings.

The casing of the piano in general contour is similar to that of the ordinary upright piano. The end pieces 10 are of about the usual height and the front upper corners are cut away, as shown at 11, the fixed top 12 being provided at its forward edge with a hinged cover 13, which may be raised to the same level as the fixed top to provide an opening for the escape of sound-waves or may be closed to form a tight casing. At this as at other open portions of the casing are preferably arranged strips 14 of rubber or similar material in order to make the casing as air-tight as possible. At the front of the piano is arranged a fall-board 16, arranged within the end sills 17 and provided with a music-rest 18.

At the front of the piano-casing below the keyboard I preferably provide a vertically-swinging door or panel 19, which may be opened and closed by means of a pedal 20, of substantially bell-crank form and connected at its upper end with the door 19 by means of a link 21. In addition to the pedal 20 are employed the usual soft and loud pedals 22 and 23, having the usual connections with a common form of damper mechanism. I preferably also provide at the front of the instrument an adjustable foot-rest 24, which may have auxiliary detachments 25 for connection with the pedals 22 and 23 to permit of the operation of such pedals by a child.

The piano-strings are carried by a frame substantially rectangular in outline and of a construction more clearly illustrated in Fig. 6, comprising an open plate having a lower forwardly-projecting flange 26 and at its rear being provided with a series of edge flanges, forming a receptacle and support for the sounding-board. At the top of the plate are formed open spaces for the reception of the wrest-plank 27, the construction of which is more clearly shown in Fig. 9, its forward face being arranged in two planes, one vertical, as at 28, for the reception of the tuning-pins of the bass string and one inclined, as at 29, for the reception of the tuning-pins of the treble wires. The upper portion of the frame immediately below the wrest-plank is connected at a point midway of the width of the plate to a diagonally-arranged brace 30, extending from one of the lower corners of the plate, and this brace is connected intermediate of its length to the upper corner of the plate by a second diagonal brace 31 and forming a triangularly-braced structure, which will give the strongest possible resistance to the stress of the strings. In the main body of the frame is formed an opening 32, through which projects a treble sounding-bridge 33, and the space or opening thus formed is bridged by an arched brace 34, extending diagonally of the frame from the lower flange 26 to a point under the outer end of the bass wrest-bridge 35. This brace 34 extends on a line parallel with the bass scale and offers direct resistance to the stress of the bass strings. On the face of the string-frame is formed a brace 36, extending substantially in alinement with the treble sounding-board bridge from a point at one side of the frame to the lower flange 26. The two braces 34 and 36 cross each other in the form of an X and form a substantial support for the portion 37 of the frame to which the treble hitch-pins are secured. The structure is further strengthened by the bass hitch-pin plates 38 and 39, which extend in vertical lines between the lower flange and the brace 36. The structure of this frame is such as to offer the greatest strength possible with a given weight of metal, and at the same time it dispenses entirely with the short brace usually found bridging the open space between the treble hitch-pin plate and the treble wrest-bridge. This short brace has been highly objectionable in that it necessitates a division of the treble scale and the cutting away of the treble sounding-board bridge to admit it. It is not infrequently the case that one or more of the guide-pins adjacent to this cut-away portion of the bridge break through the thin wood, leaving an injury difficult to repair. It is further noticeable in some pianos that the notes on either side of this brace are defective, having less tone volume than the others, and what there is being of an inferior quality. A further objection to such a brace is that there must be an offset in the action, necessitating considerable work in the adjustment of the keys. A string-frame made in accordance with this invention remedies these defects without weakening the frame.

At the rear of the string-frame are a series of integral flanges 40, forming a box-like structure for the reception of the sounding-board, and the upper flange forms a rest and support for the wrest-plank. It will be noted that the construction of the frame renders unnecessary the rearward slanting of the bass section of the wrest-plank, this bass section being arranged in a vertical plane, as shown more clearly in Fig. 10.

The lower edge of the string-frame is supported on a lower sill 41, and at intervening points are provided notches for the reception of transversely-arranged sills 43 and 44, carried by the frame of the piano.

The sounding-board 45 is arched, as usual, and to its concaved rear face are secured the usual strengthening-ribs 46. The edges of the board are confined in a wooden frame 47, which completely encircles said board and forms in connection with the rear portion of the piano-casing an inclosed chamber containing a body of air, which is kept in a constant state of vibration while the instrument is in use, the sound-waves escaping through one or more openings 48, formed in the sounding-board, any desired number of openings being employed, and such openings being disposed and arranged as best suited to their purpose. In some instances a single opening will be sufficient, and in other cases I prefer to arrange one opening under the treble scale and another under the bass scale. In other cases a series of openings is formed from the upper half of the sounding-board, such openings being of gradually-diminishing diameter from the bass to the treble scales.

The external dimensions of the sounding-board frame are such as to fit very tightly within the flanges 40 of the string-frame, and the sounding-board frame is forced by a suitable screw or other pressure tightly within the flanges, the latter then holding the sounding-board in arched position, so that it may more readily resist the strain of the strings on the sounding-board bridges. On the outer face of the sounding-board is secured the treble bridge 33, previously referred to, the bass bridge being divided into two sections 50 and 51, of which the bridge 50 carries the large strings, where but one string is used to a note, and the bridge 51 carries the notes that are double-strung. The sections 50 and 51 of the bass bridge project through openings formed in the string-frame immediately in front of the bass hitch-pin plates 38 and 39, respectively.

In upright pianos as ordinarily constructed the back of the piano is formed of a massive frame of wood containing some five or six or more vertically-arranged beams situated directly in the rear of and supporting the sound-board. These beams will to some considerable extent deflect the sound-waves and prevent the vibrations of the sounding-board being transmitted to the air of the room without some changes which must occur by reason of the beams. The sound-waves, moreover, are usually directed against the wall of the room in which the piano is placed, and this, in connection with the beams, must to some extent absorb and interfere with the passage of the sound-waves.

When it is desirable to permit the escape of a large volume of sound, I provide the rear of the piano with a panel 52, forming the closure of the sound-chamber, said panel being hinged at 53 to the lower portion of the casing and at its upper end being provided with turn-buttons 54, of the usual type, adapted to engage with suitable openings in the side or top walls of the sound-chamber and hold the panel in a closed position. To each side of the inner face of the panel is secured one end of a leather or other strap 55, provided with a number of perforations, any one of which may be engaged in a hook 56, carried by the side wall of the sound-chamber and permitting the opening of the panel to any desired angle. As there are no beams at the rear of the sound-board to impede the passage of the sound-waves, the vibrated air will strike against the inclined surface of the panel and will be deflected upwardly into the room.

In many cases it is desirable to place the piano in such position in a room that the back of the instrument will be exposed to view. Generally the unfinished condition of the average piano will render this objectionable, and further, the vibrations of the sound-board as transmitted through the air in the rear of the instrument will be much too loud for ordinary purposes.

In carrying out my invention I provide the rear of the piano with a casing as well finished and equally attractive in appearance as the front, so that the instrument may be placed in any desired position. Further than this, the panel 52 and the top lid and front panel of the casing may be tightly closed and form a practically air-tight casing, which will prevent any direct escape of sound-waves from the piano, the air in the room receiving its vibrations indirectly through the medium of the casing. In this manner the tone may be softened for practice purposes or for ordinary accompaniments. When the full volume of sound is preferred, the opening of the piano will permit the escape of the sound-waves, without, however, the highly-objectionable loud tone at the back of the instrument, the sound-waves at this point being deflected upwardly by the panel 52. The panel may be adjusted at any desired angle by the perforations in the engagement-straps 55 and the hooks 56, or any other suitable or desirable adjusting means may be employed for this purpose. By constructing the piano in the manner described the heavy beams for the support of the sounding-board are entirely dispensed with, so that the escape of the sound-waves is not interfered with in any manner. At the same time the sounding-board is held perfectly in position, its arched or crowned shape being retained under any and all atmospheric conditions by reason of the clamping and holding of its edges within the integral flange of the string-frame. The result attained is highly desirable and at the same time the cost of production is materially lessened.

Various changes in the form and proportions and modifications of the details of construction of the instrument may be made without departing from the spirit or sacrificing any of the advantages of my invention.

Having thus described my invention, what I claim is—

1. The combination in a piano, of a string-frame having an open space for the reception of a continuous treble sounding-board bridge, a sounding-board having a bridge disposed in said space, an uninterrupted treble scale carried by the string-frame and bearing on said bridge, and a brace extending over the spaced portion of the frame over and at an angle to the line of the strings constituting the treble scale.

2. In a piano, the combination with a string-frame having an open space for the reception of a treble sounding-board bridge, of a sounding-board having a bridge disposed in said space, an uninterrupted treble scale carried by the string-frame and bearing on said bridge, and a diagonally-disposed brace formed integral with the string-frame and bridging the spaced portion of the frame, said brace being arranged in general alinement with but wholly outside the bass scale and being arched to extend over a part of the treble scale and thus form a free space for the passage for said treble scale.

3. In a piano, the combination with a string-frame having a continuous open space for the reception of a treble sounding-board bridge, of a pair of substantially diagonal braces formed integral with said string-frame, one of the braces being arched and bridging the spaced portion at a point outside the bass scale and the second brace crossing the first and extending in substantial alinement with the hitch-pin plate, a sounding-board having a bridge disposed in said open space, and an uninterrupted treble scale carried by the string-frame and bearing on said bridge.

4. A string-frame comprising a plate having integral main braces so disposed as to cross each other and one extending in general alinement with the treble sounding-board bridge and the second in alinement with the bass scale, and a base-flange arranged on the lower edge of said frame and forming an abutment for said braces, said frame having a continuous open space to preserve the continuity of the treble sounding-board bridge and the treble scale, substantially as specified.

5. A string-frame comprising a plate having integral main braces so disposed as to cross each other and one extending in general alinement with the bass scale, and the second in alinement with the treble sounding-board bridge, a base-flange arranged on the lower edge of the frame and forming an abutment for said braces, and bass hitch-pin plates extending from said second brace to said flange, said string-frame having a continuous open space to preserve the continuity of the treble sounding-board bridge and the treble scale.

6. A string-frame adapted for the reception and support of a continuous and uninterrupted treble scale and having open spaces for the reception of a single treble sounding-board bridge and a two-part bass sounding-board bridge, said frame comprising a metallic plate or body portion including diagonally-arranged braces 30 and 31 disposed at right angles to each other, the latter braces being parallel with the strings forming the bass scale, crossing braces 33 and 36 extending from the lower edge of the plate to points near the opposite sides thereof, and vertical braces 38 and 39 extending from the lower edge of the plate to the braces 36 and forming hitch-pin plates for the bass scale.

7. A string-frame having an upper flange, a wrest-plank supported thereon, said frame having its upper face arranged partly in a vertical and partly in an angular plane for the reception of the corresponding bass and treble portions of the wrest-plank.

8. A wrest-plank having one section for the reception of the bass-scale pins arranged in a vertical plane and a second section for the reception of the treble-scale pins arranged at an angle to said vertical plane.

9. The combination in a piano of a string-frame having an integral rearwardly-extending flange forming a continuous wall or casing, and a slightly arched or crowned sounding-board and sounding-board-carrying frame confined in position by said wall or casing, the contact of the edges of the sounding-board with said wall serving to maintain said sounding-board in arched or crowned position and preventing lateral spreading.

10. The combination in a piano, of a string-frame having on its rear face a continuous integral flange forming a substantially rectangular wall or casing, a sounding-board arranged within said wall or casing and held in arched or crowned position by the engagement of its edges with said wall or casing, and a sounding-board-carrying frame also held by pressure between the wall or casing and secured to said sounding-board.

In testimony that I claim the foregoing as my own I have hereto affixed my signature in the presence of two witnesses.

LEVI WATSON NORCROSS.

Witnesses:
R. A. FLANAGAN,
P. E. WEST.